United States Patent [19]
Kashiwase

[11] Patent Number: 6,066,058
[45] Date of Patent: May 23, 2000

[54] AUTOMATIC TRANSMISSION

[75] Inventor: Hajime Kashiwase, Tokyo, Japan

[73] Assignee: Fuji Jukogyo Kabushiki Kaisha, Tokyo, Japan

[21] Appl. No.: 09/173,593

[22] Filed: Oct. 15, 1998

[30] Foreign Application Priority Data

Oct. 23, 1997 [JP] Japan .................................. 9-291311

[51] Int. Cl.⁷ .................................................. F16H 47/02
[52] U.S. Cl. .............................................. 475/44; 475/39
[58] Field of Search ................................ 475/35, 36, 39, 475/40, 41, 44

[56] References Cited

U.S. PATENT DOCUMENTS

| | | | |
|---|---|---|---|
| 2,956,448 | 10/1960 | Edsall | 475/44 X |
| 3,528,321 | 9/1970 | Harmon et al. | 475/44 X |
| 3,789,697 | 2/1974 | Hobbs | 475/44 |
| 4,140,029 | 2/1979 | Lee | 475/39 X |
| 4,325,270 | 4/1982 | McRae | 475/44 X |
| 4,800,779 | 1/1989 | Parker | 475/44 X |
| 4,919,009 | 4/1990 | Newman et al. | 475/44 |
| 5,857,934 | 1/1999 | Ohkubo | 475/44 |

FOREIGN PATENT DOCUMENTS 2033029   5/1980   United Kingdom .

Primary Examiner—Khoi Q. Ta
Attorney, Agent, or Firm—Martin A. Farber

[57] ABSTRACT

An automatic transmission using a torque converter as a starting apparatus comprises a stator hub, an one-way clutch both of which are offset on the pump impeller side respectively, a brake cylinder case provided in an inner diameter portion of the torque converter, a brake piston provided in the brake cylinder case, a part or the whole of a reverse brake and a part of or the whole of a planetary gear which are accommodated in the inner diameter portion of the torque converter, thereby the axial length of the automatic transmission can be reduced.

8 Claims, 5 Drawing Sheets

AUTOMATIC TRANSMISSION

BACKGROUND OF THE INVENTION

1. Field of the Invention

The present invention relates to an automatic transmission for an automobile and more particularly to an automatic transmission whose torque converter incorporating a part or the whole of a forward and reverse changeover apparatus therein.

2. Prior Art

Generally, an automatic transmission having a continuously variable transmission comprises a starting apparatus for controlling a power transmission from an engine to a transmission on starting, a forward and reverse changeover apparatus for reversing the rotational direction of a drive shaft in order to propel a vehicle in the reverse direction and a clutch section for changing over driving force supplied to the forward and reverse change over apparatus.

FIG. 4 shows a skeleton of a conventional continuously variable automatic transmission 1 in which a torque converter is used as a starting apparatus.

The continuously variable automatic transmission 1 comprises a starting apparatus 2 connected to an engine 25, a continuously variable transmission 3, a forward and reverse changeover apparatus 4 interposed between the starting apparatus 2 and the continuously variable transmission 3. The forward and reverse changeover apparatus 4 includes a forward clutch 5 for connecting and disconnecting a transmission of driving force from the starting apparatus 2, a planetary gear 6 for reversing the driving force from the starting apparatus 2 and a reverse brake 7 for operating and stopping the planetary gear 6.

At a forward running, a clutch plate 5a of the forward clutch 5 is in the engagement condition where the driving force from the starting apparatus 2 is transmitted to a pulley input shaft 3b connected to a primary pulley 3a of the continuously variable transmission 3 through a clutch drum 5b and a clutch hub 5c. When starting, power is transmitted to the clutch drum 5b through a working fluid of a torque converter 2a in the starting apparatus 2. After being transferred to a normal running, a lock-up clutch 2b is engaged to transmit the driving force of the engine 25 directly to the clutch drum 5b without going through the torque converter 2a.

On the other hand, at a reverse running, the clutch plate 5a is disengaged and at the same time a brake plate 7a of the reverse brake 7 is engaged. As a result, a ring gear 6a of the planetary gear 6 is fixed to the transmission case and a double-arranged planetary pinion 6c supported by a planetary carrier 6b which is connected with the clutch drum 5b, rotates a sun gear 6d connected with the pulley input shaft 3b in the reverse direction at a reduced speed.

FIG. 5 shows an example of the case where the engine 25 and the automatic transmission 1 are arranged transversely, in which an overall width $W_s$ of the combination of the engine 25 and the automatic transmission 1 must be of a size capable of accommodating the engine 25 and the automatic transmission 1 in an engine room 8a.

Recent motor vehicles have a frame 9 on both sides of the engine room 8a respectively in order to absorb an impact in case the vehicle has a collision. Furthermore, a front tire 10 is arranged outside of the frame 9, respectively.

The frame 9 must have a certain amount of sectional area sufficient to have rigidity for securing a safety on impact and also the front tire is required to move within as large steering angle as possible in order to obtain a small turning circle radius. Further, recent motor vehicles have a tendency to reduce the width of the vehicle body due to a necessity of improving fuel economy.

As a result of this, a space for accommodating the engine 25 and the transmission 1 in the engine room 6a tends to decrease, therefore the overall width $W_S$ of the combination of the engine and transmission is required to be shortened as far as possible. One idea for realizing this is to reduce a widthwise size $W_T$ of the automatic transmission 1 itself.

However, in the conventional automatic transmission 1, since the starting apparatus 2, the forward and reverse changeover apparatus 4 and the transmission 3 are arranged in a power transmitting order, it is technically difficult to reduce the size $W_T$ in the axial direction of the automatic transmission 1.

That is, in order to reduce the size $W_T$ in the axial direction of the automatic transmission 1 arranged in this manner, several means such as decreasing the pulley ratio of the continuously variable transmission, reducing the width of a belt wound around both pulleys, closing clearances between components or the like can be considered. However, any of these means may adversely affect the function of the automatic transmission 1 or may reduce the rigidity and strength of the transmission 1.

To solve this, for example, UK Patent Application Laid-Open No. 2033029A discloses a technique in which a fluid coupling is employed as a starting apparatus and a planetary gear of the forward and reverse changeover apparatus is accommodated in an inner diameter portion (on the engine side) of the fluid coupling in order to shorten the axial length of the automatic transmission.

However, since the fluid coupling inherently does not have a torque amplifying effect, some other means for amplifying torque are additionally needed, this resulting in the complicated construction of the automatic transmission.

Further, according to this prior art, since the reverse brake mechanism for reversing the planetary gear is arranged between the fluid coupling and the continuously variable transmission and the carrier of the planetary gear is connected with the brake plate of the reverse brake mechanism through a sleeve, the construction is not only complicated, but also the axial length of the automatic transmission is elongated due to the reverse brake mechanism provided between the fluid coupling and the continuously variable transmission.

In general, the torque converter is used more often for the starting apparatus of the continuously variable transmission than the fluid coupling is done, mainly because a stator incorporated in the torque converter serves as amplifying torque when the vehicle starts from the idling condition of the engine.

However, in case where the torque converter is introduced in a place of the fluid coupling, the stator make it difficult to secure a space for accommodating the planetary gear in the inner diameter position of the torque converter, thereby it is technically difficult to reduce the axial size of the automatic transmission.

SUMMARY OF THE INVENTION

In view of the aforesaid problems of the prior arts, it is an object of the present invention to provide an automatic transmission using a torque converter as a starting apparatus and having a short width so as to be able to be accommodated transversely in a limited space of the engine room.

In order to achieve the object, the automatic transmission using a torque converter including a pump impeller, a turbine runner and a stator comprises, an input shaft for transmitting a driving force to a transmission means, a stator shaft provided around the input shaft, a stator hub provided being offset on the side of the pump impeller, a reverse brake, a brake piston interposed between the stator and the stator shaft for actuating the reverse brake, a sun gear integrally coupled with the input shaft, a double pinion planetary gear interposed between the sun gear and the reverse brake, a planetary carrier connected with the turbine runner for rotatably supporting the planetary gear from both sides thereof, a brake cylinder case interposed between the stator hub and the stator shaft for accommodating the brake piston and an one-way clutch interposed between the stator hub and the brake cylinder case while being offset on the side of the pump impeller.

DESCRIPTION OF THE DRAWINGS

By way of example only, embodiments of the present invention will now be described, with reference to the accompanying drawings, in which.

DETAILED DESCRIPTION OF THE INVENTION

Figure 1:
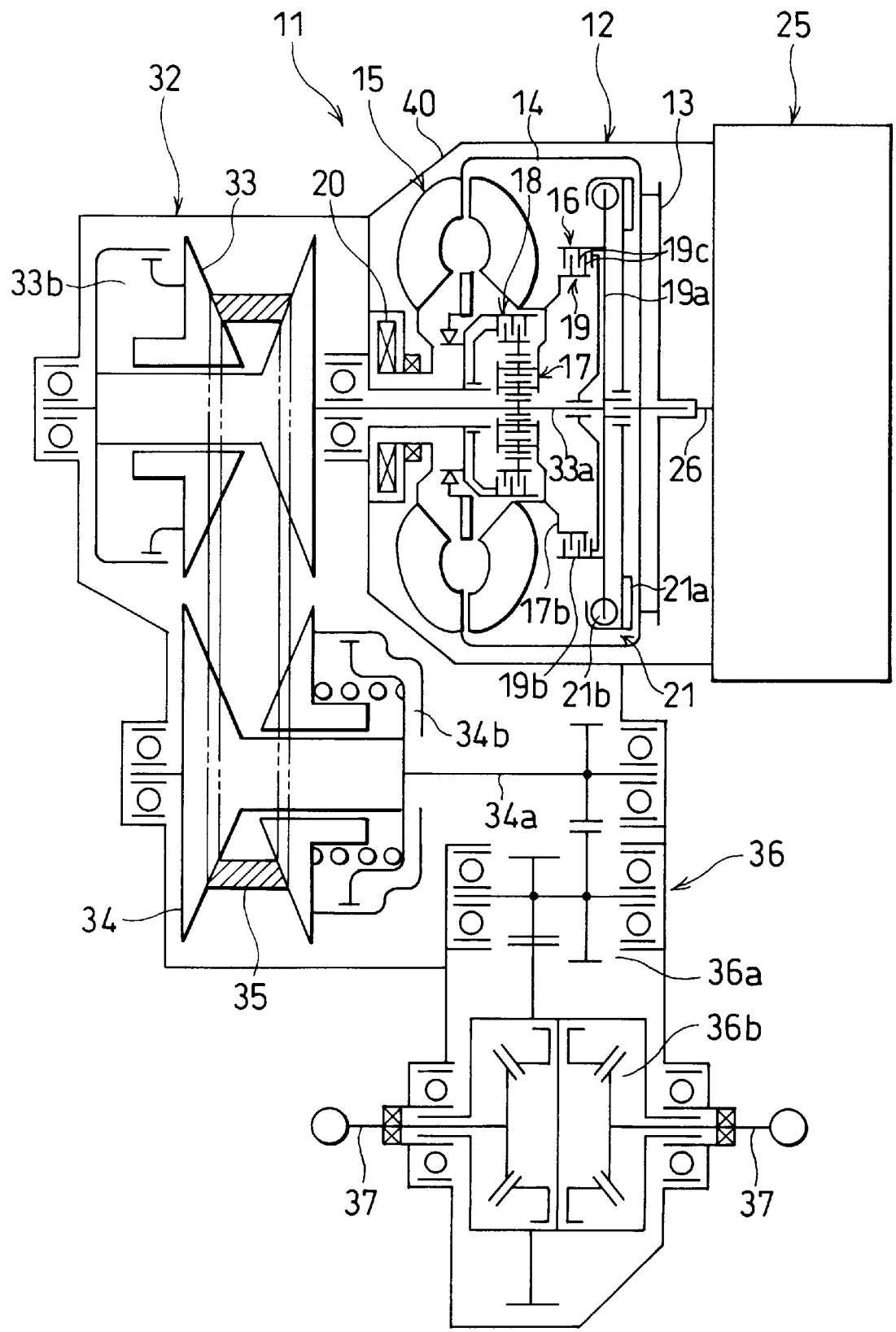
FIG. 1 is a schematic view showing an automatic transmission according to a first embodiment of the present invention.

Referring now to FIG. 1, numeral 11 denotes an automatic transmission including a starting apparatus 12 connected with an engine 25 and a continuously variable transmission 32.

The starting apparatus 12 has a drive plate 13 connected with a crank shaft 26 of the engine 25 and further the drive plate 13 is connected with a torque converter case 14 which is extended towards the continuously variable transmission 32. Further, the torque converter case 14 is connected with a pump impeller 15a of a torque converter 15 which is disposed at the rear of the starting apparatus 12.

The torque converter 15 comprises the pump impeller 15a, a turbine runner 15b driven by the pump impeller 15a through a working fluid and a stator 15c for rectifying the stream of the working fluid. Further, the pump impeller 15a is connected with a pump drive shaft 20a of an oil pump 20.

Further, the continuously variable transmission 32 comprises a primary pulley 33, a secondary pulley 34 and a belt 35 looped over both pulleys. A pulley input shaft 33a supported by the primary pulley 33 is extended towards the starting apparatus 12. Further, a pulley output shaft 34a supported by the secondary pulley 34 is connected with a differential 36b through a reduction gear set 36a of a final reduction gear unit 36. Further, the differential 36b is connected with a drive shaft 37 for driving front or rear wheels of the vehicle.

The width of a groove of the primary pulley 33 is varied by a primary hydraulic pressure supplied to a primary oil chamber 33b which is provided adjacent to the primary pulley 33 so as to obtain a desired reduction ratio. Also, a secondary hydraulic pressure supplied to a secondary oil chamber 34b which is provided adjacent to the secondary pulley 34 varies the width of a groove of the secondary pulley 34 and at the same time gives a tension needed for the torque transmission to the belt 35 through the secondary pulley 34. The above primary and secondary hydraulic pressures are established according to engine operating conditions and the like in a transmission control unit (not shown).

The torque converter case 14 incorporates a forward and reverse changeover apparatus 16 and a lock-up clutch 21 therein. The forward and reverse changeover apparatus 16 comprises a planetary gear 17, a reverse brake 18 and a forward clutch 19.

A lock-up clutch plate 21a of the lock-up clutch 21 faces the torque converter case 14 on the engine 25 side. Further, the lock-up clutch plate 21a is connected with a damper hub 19a through a damper unit 21b. The damper hub 19a is provided with a forward clutch 19 and is connected with the pulley input shaft 33a.

Further, a clutch drum 19b of the forward clutch 19 extends from the mid-portion of the damper hub 19a towards the torque converter 15 and the inner periphery of the clutch drum 19b faces an end portion of a planetary carrier 17b supporting a double planetary pinion 17a of the planetary gear 17 through a clutch plate 19c. Further, the other end of the planetary carrier 17b is connected with the turbine runner 15b.

Figure 2:
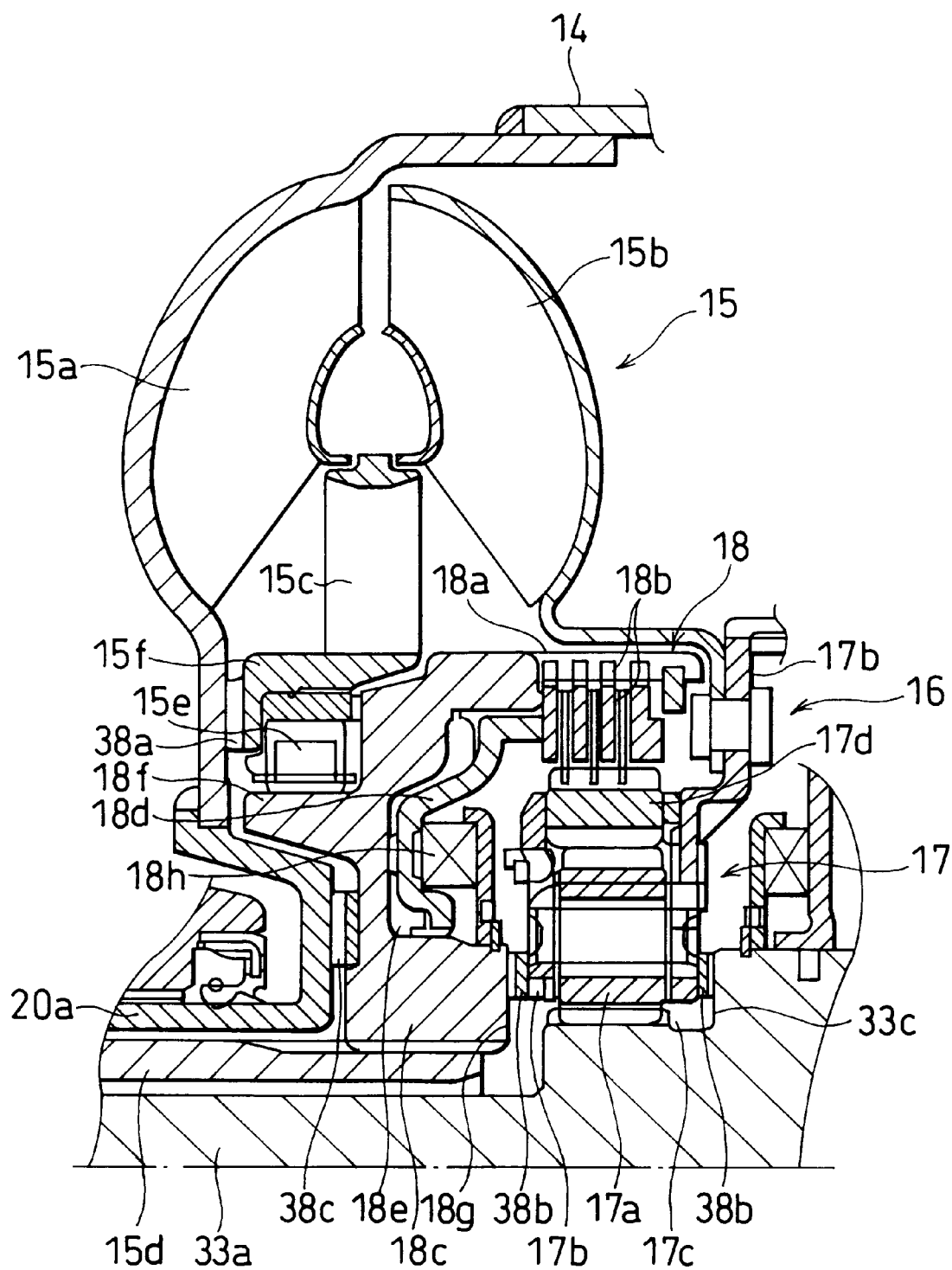
FIG. 2 is an enlarged view of a portion relating to the first embodiment of the present invention.

Further, referring to FIG. 2, a sun gear 17c of the planetary gear 17 is rigidly connected with or formed integrally with the pulley input shaft 33a. The sun gear 17c meshes with the double planetary pinion 17a and also the double planetary pinion 17a meshes with a ring gear 17d. Further, the outer periphery of the ring gear 17d faces a brake drum 18a of the reverse brake 18 through a brake plate 18b.

Further, the brake drum 18a is connected with a brake cylinder case 18c which is accommodated in an inner diameter portion of the torque converter 15. Further, the pulley input shaft 33a is inserted to a stator shaft 15d. The brake cylinder case 18c is spline-fitted to the stator shaft 15d which is fixed to a housing 40 for accommodating the starting apparatus 12.

Further, a brake piston 18d for applying a working pressure to the brake plate 18b is slidably provided in the brake cylinder case 18c and a brake operating chamber 18e is formed between the brake cylinder case 18c and the brake piston 18d.

A stator supporting shaft 18f extends from the brake cylinder case 18c on the opposite side of the brake piston 18d and a stator hub 15f formed on the inner periphery of the stator 15c is supported by the stator supporting shaft 18f through an one-way clutch 15e.

This stator hub 15f is disposed being offset from the center of the stator 15c toward the pump impeller 15a in the axial direction and its end surface is supported by the pump impeller 15a through a sliding member 38a such as a thrust bearing.

Thus, the stator hub 15f being offset in the direction of the pump impeller 15a, a space for accommodating the brake cylinder case 18c can be secured in the inner diameter portion of the torque converter 15. In this embodiment, the stator supporting shaft 18f serves as an inner race of the one-way clutch 15e.

As shown in FIG. 2, the outer periphery surface of the brake drum 18a is formed at almost the same level as the outer periphery surface of the stator hub 15f. Therefore, the outer periphery surface of the brake drum 18a serves as a guide surface for guiding oil flowing through the stator. Further, according to this embodiment, the whole portions of the brake cylinder case 18c, the brake piston 18d and the brake operating chamber 18e are accommodated in the inner diameter portion of the torque converter 15 and at least parts of the brake plate 18b and the planetary gear 17 intrude into the inner diameter portion of the torque converter 15.

Further, the planetary carrier 17b is composed of two members arranged in parallel in the axial direction, an inner member and an outer member. The double planetary pinion 17a and the ring gear 17d are restricted by these inner and outer members. Further, the inner and outer members of the planetary carrier 17b are slidably supported respectively in the axial direction by thrust bearings 38b, 38b provided between an opposing face 18g of the brake cylinder case 18c and an opposing face 33c of the pulley input shaft 33a.

Further, the turbine runner 15b of the torque converter 15 is indirectly supported by the pulley input shaft 33a through the planetary carrier 17b, the double planetary pinion 17a and the sun gear 17c.

Also, the back side (left side in the drawing) of the brake cylinder case 18c is slidably supported in the axial direction by a thrust bearing 38c.

Describing an operation of thus constituted construction of the automatic transmission according to the first embodiment, when the engine 25 starts, the pump impeller 15a of the torque converter 15 is rotated through the crank shaft 26, the drive plate 13 connected with the crank shaft 26 and the torque converter case 14 and the turbine runner 15b opposed to the pump impeller 15a is driven through the working fluid. On the other hand, this working fluid returns to the pump impeller 15a after being rectified by the stator 15c.

When the select lever (not shown) is positioned at "N" range or "P" range, since the brake plate 18b of the reverse brake 18 provided in the starting apparatus 12, the clutch plate 19c of the forward clutch 19 and the lock-up clutch plate 21a of the lock-up clutch 21, are all released, the power of the turbine runner 15b is transmitted to the planetary carrier 17b supporting the double planetary pinion 17a to rotate the planetary carrier 17b integrally.

Then, the double planetary pinion 17a and the ring gear 17d idle around the pulley input shaft 33a extended from the primary pulley 33, while those are supported between the opposed face 18g of the brake cylinder 18c and the opposed face 33c formed on the pulley input shaft 33a by the planetary carrier 17b positioned through the thrust bearings 38b, and as a result the power is not transmitted to the pulley input shaft 33a.

When the select lever is positioned at the forward range such as "D" range, the clutch plate 19c of the forward clutch 19 is engaged and the planetary carrier 17b is connected with the clutch drum 19b. As a result, the driving force is transmitted to the pulley input shaft 33a extended from the primary pulley 33 of the continuously variable transmission 32 through the clutch drum 19b to rotate the primary pulley 33 in the forward running direction.

Further, during the forward running, when a lock-up operating condition is satisfied, the lock-up clutch plate 21a of the lock-up clutch 21 is engaged to transmit the driving force transferred through the drive plate 13, the torque converter case 14 and the damper unit 21 directly to the damper hub 19a connected with the pulley input shaft 33a without going through the working fluid.

On the other hand, in order to propel the vehicle in the reverse direction, when the select lever is placed at "R" range, the clutch plate 19c of the forward clutch 19 is released. At the same time, the brake piston 18d receives hydraulic pressure supplied to the brake operating chamber 18e and pushes the brake plate 18b of the reverse brake 18 to fix the ring gear 17d of the planetary gear 17.

When the ring gear 17d of the planetary gear 17 is fixed, the double planetary pinion 17a is rotated through the planetary carrier 17b linked with the turbine runner 15b and as a result the sun gear 17c connected with the pulley input shaft 33a is rotated in the reverse direction at reduced speeds.

In this case, when the torque converter is in a stall speed zone, since the direction of torque applied to the inner race of the one-way clutch 15e because of the reaction force from the stator 15c is opposite to the direction of torque applied to the brake drum 18a subjected to the reaction force from the planetary gear 17, both torques are applied in the canceling direction to the brake cylinder case 18c and therefore the torque applied to the stator shaft 15d supporting this brake cylinder case 18c is reduced.

Hence, according to this embodiment, since the forward and reverse changeover apparatus 16 is nested in the torque converter case 14 and further the stator hub 15f is offset in the axial direction on the pump impeller 15a side, a space for accommodating the brake cylinder case 18c can be secured in the inner diameter portion of the torque converter 15. Furthermore, since a part of the brake drum 18a adjacent to the brake cylinder case 18c, a part of the brake plate 18b arranged in the radial direction of the brake drum 18a and a part of the planetary gear 17 are accommodated in the torque converter 15, the size of the automatic transmission 11 in the axial direction can be substantially reduced, thereby the engine and the automatic transmission can be mounted transversely in the narrow engine room.

Further, since the stator supporting shaft 18f is used in place of an inner race of the one-way clutch 15e and also the turbine runner 15b of the torque converter 15 is supported by the planetary carrier 17b, the number of components can be reduced and as a result not only the widthwise size of the automatic transmission 11 can be further reduced, but also the manufacturing cost can be reduced.

Further, since the forward and reverse changeover apparatus 16 is built in the torque converter case 14, the assembly of the torque converter 15 and the assembly of the forward and reverse changeover apparatus 16 can be accomplished simultaneously, thereby the assembly man hour and the manufacturing cost can be decreased.

Further, since the turbine runner 15b, the planetary gear 17 and the brake cylinder case 18c are supported by each other in the thrust direction through thrust bearings 38a, 38b, 38c, the number of the components can be reduced, compared with the case where the constituent components are supported independently and this is substantially beneficial in reducing the axial length of the automatic transmission.

In the reverse running, when the torque converter is in a stall speed zone, since the direction of torque applied to the inner race of the one-way clutch 15e is opposite to the direction of torque applied to the brake drum 18a subjected to the reaction force from the planetary gear 17, both torques are applied in the canceling direction to the brake cylinder case 18c and therefore the torque applied to the stator shaft 15d supporting this brake cylinder case 18c is reduced and the strength of the stator shaft 15d can be decreased relatively. This leads to simplifying the construction for supporting the brake cylinder case 18c.

Further, since the planetary carrier 17b acts as transmitting the driving force from the turbine runner 15b of the torque converter 15 to the pulley input shaft 33a and also transmitting the driving force from the forward clutch 19 to the pulley input shaft, the number of the constituent components can be reduced and the overall size of the apparatus can be decreased.

Figure 3:
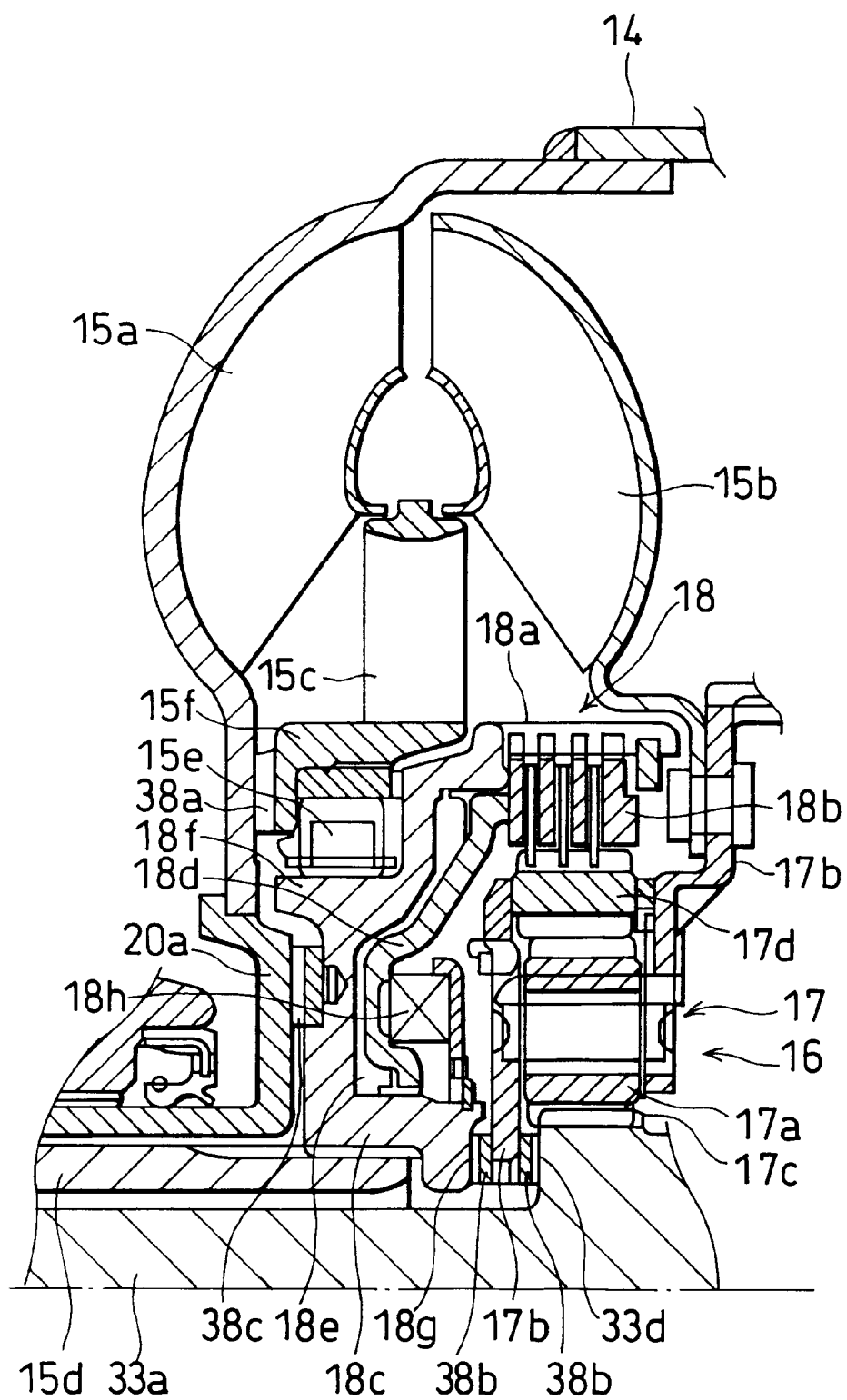
FIG. 3 is an enlarged view of a portion relating to a second embodiment of the present invention.
Figure 4:
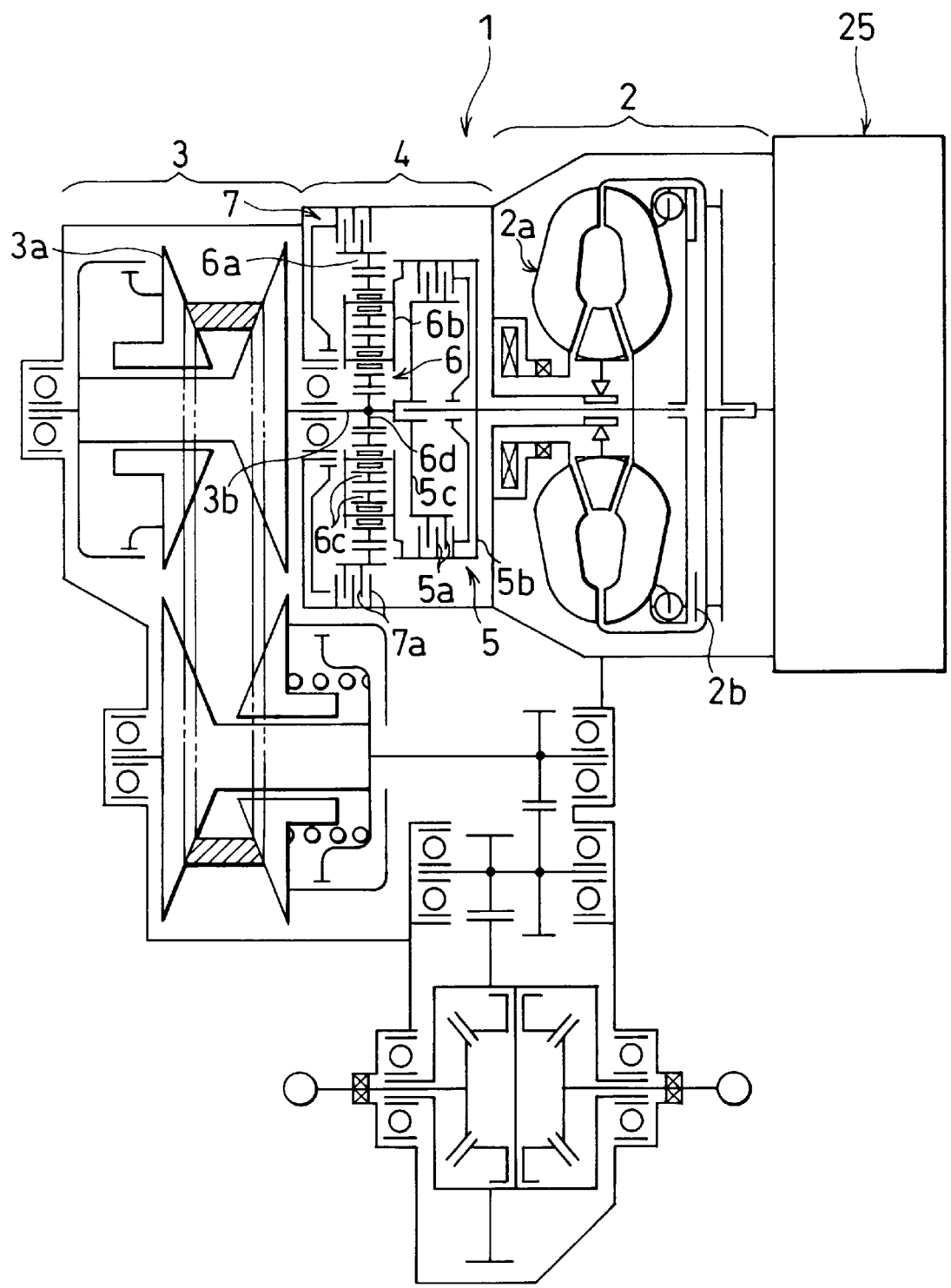
FIG. 4 is a schematic view showing a continuously variable automatic transmission according to a prior art.
Figure 5:
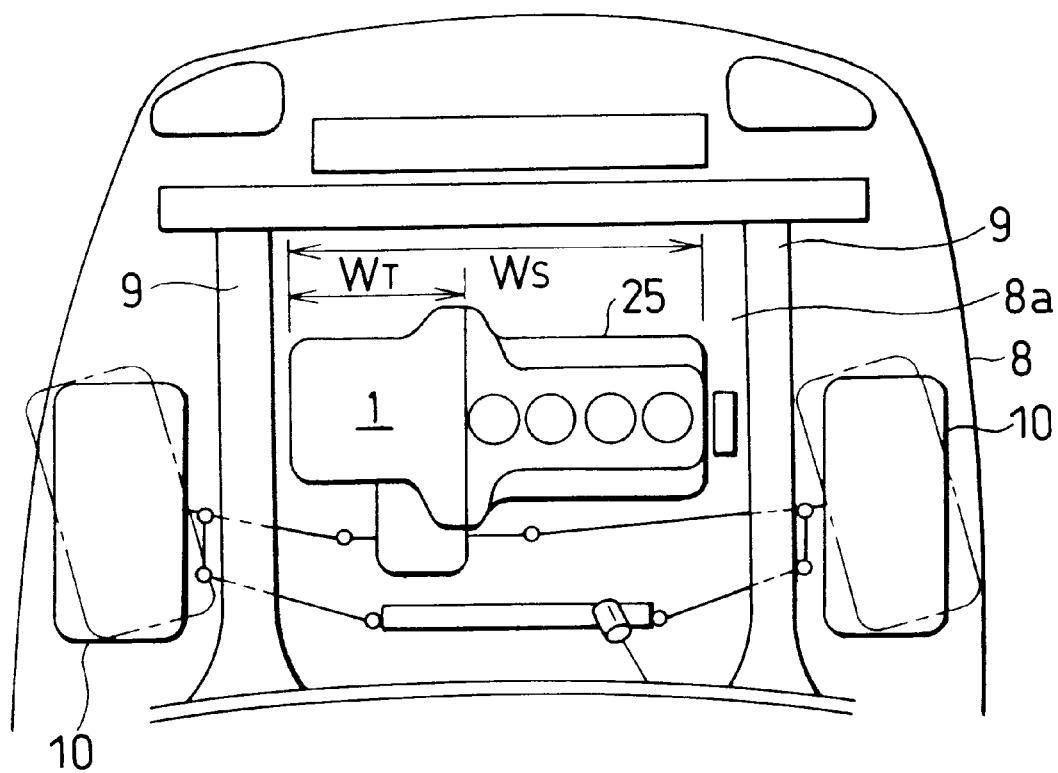
FIG. 5 is a schematic plane view showing a layout of an automatic transmission integrally coupled with an engine which is mounted transversely in an engine room.

Next, describing a second embodiment of the present invention with reference to FIG. 3, the double planetary pinion 17a is supported on both sides thereof by the planetary carrier 17b in the same manner as in the first embodiment. The planetary carrier 17b is slidably supported at an inwardly extended portion thereof by two thrust bearings 38b, 38b, one of which is provided on the opposing face 18g of the brake cylinder case 18c and other of which is provided on the opposing face 33c of the pulley input shaft 33a.

Therefore, since the diameter of the thrust bearings 38b, 38b can be reduced compared to those of the first embodiment, the return spring 18h of the brake piston 18d can be located deeper into the inner diameter portion of the torque converter 15.

As a result, related components of the forward and reverse changeover apparatus 16, i.e., the brake drum 18a, the brake plate 18b, the brake cylinder case 18c for supporting these, and almost the whole portion of the planetary gear 17 can be shifted to the left and can be accommodated deep in the inner diameter portion of the torque converter 15. As a result, the axial size of the automatic transmission 11 can be further reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automatic transmission having a continuously variable transmission, a lock-up clutch, a reverse brake and a torque converter including a torque converter case driven by an engine, a pump impeller integrally coupled with said torque converter case, a turbine runner driven by said pump impeller through working fluid and a stator provided between said pump impeller and said turbine runner, comprising:

an input shaft provided at the center of said torque converter for transmitting a driving force from said torque converter to said transmission;

a stator shaft provided around said input shaft;

a stator hub provided being offset on the side of said pump impeller for mounting said stator;

a forward clutch adjacent to said turbine runner connected with said turbine runner;

a brake cylinder case interposed between said stator hub and said stator shaft in an overlapping manner concentrically, and being provided in an inner diameter portion of said torque converter;

a brake drum of said reverse brake connected with said brake cylinder case;

a ring gear;

a brake plate provided between said brake drum and said ring gear;

a brake piston slidably movably in said brake cylinder case for operating said brake plate;

a return spring for biasing said brake piston;

a sun gear integrally coupled with said input shaft;

a planetary carrier including an outer member and an inner member arranged in the radial direction and said outer member connected with said turbine runner so as to form a rotating axis of said turbine runner;

a planetary gear meshing with said sun gear and said ring gear between and rotatably connected with said planetary carrier being interposed between said outer and inner members of said planetary carrier;

a stator supporting shaft integrally formed on the opposite side of said brake piston with said brake cylinder case; and a one-way clutch interposed between said stator hub and said stator supporting shaft, while being offset on the side of said pump impeller.

2. The automatic transmission according to claim 1, wherein said forward clutch, said lock-up clutch, said reverse brake and said planetary gear are accommodated in said torque converter case.

3. The automatic transmission according to claim 1, wherein said return spring has an outer diameter smaller than that of said stator supporting shaft.

4. The automatic transmission according to claim 1, wherein said reverse brake and said planetary gear are provided in the vicinity of said brake piston.

5. The automatic transmission according to claim 1, wherein said planetary carrier is slidably supported at said outer and inner members thereof by at least two thrust bearings, one of which is interposed between said brake cylinder case and said inner member of said planetary carrier and the other of which is interposed between said input shaft and said outer member of said planetary carrier.

6. The automatic transmission according to claim 1, wherein said planetary carrier is slidably supported at said inner member thereof by at least two thrust bearings, one of which is interposed between said brake cylinder case and said inner member of said planetary carrier and the other of which is interposed between said input shaft and said inner member of said planetary carrier.

7. The automatic transmission according to claim 6, wherein said thrust bearings have an outer diameter smaller than that of said sun gear.

8. The automatic transmission according to claim 1, wherein at least parts of said brake drum, said brake plate, said ring gear, said planetary carrier and said planetary gear are interposed between said turbine runner and said input shaft in an overlapping manner concentrically.

* * * * *